US006468565B1

(12) United States Patent
Anno et al.

(10) Patent No.: US 6,468,565 B1
(45) Date of Patent: Oct. 22, 2002

(54) ONION EXTRACT RICH IN SULFURIZED CYCLIC AMINO ACID AND PROCESS FOR PRODUCING THE SAME

(75) Inventors: Takahiko Anno, Otsu (JP); Masayuki Fujino, Chitose (JP); Harumichi Sawada, Hirakata (JP)

(73) Assignee: Nippon Shinyaku Co., Ltd., Kyoto (JP)

( * ) Notice: Subject to any disclaimer, the term of this patent is extended or adjusted under 35 U.S.C. 154(b) by 0 days.

(21) Appl. No.: 09/485,067
(22) PCT Filed: Aug. 10, 1998
(86) PCT No.: PCT/JP98/03569
§ 371 (c)(1), (2), (4) Date: Feb. 2, 2000
(87) PCT Pub. No.: WO99/08548
PCT Pub. Date: Feb. 25, 1999

(30) Foreign Application Priority Data

Aug. 13, 1997 (JP) .............................................. 9-218685

(51) Int. Cl.$^7$ .............................................. A23K 1/165
(52) U.S. Cl. ............................. 426/49; 426/50; 426/51; 426/52; 426/615; 426/638
(58) Field of Search .............................. 426/49, 50, 51, 426/52, 615, 638

(56) References Cited

U.S. PATENT DOCUMENTS 3,645,756 A * 2/1972 Huth ........................... 99/140
4,466,986 A * 8/1984 Guggenbuehler et al. ... 426/533
6,013,304 A * 1/2000 Todd ........................... 426/638

FOREIGN PATENT DOCUMENTS

JP                64-55158    *   3/1989

OTHER PUBLICATIONS

Ueda, Tsubuku, Miyajima, "Composition of Sulfur–Containing Components in Onion and Their Flavor Characters" Jun. 25, 1993, Biosci. Bioteach, Biochem. vol. 58(1), 108–110, 1994, pp. 108–110.*

* cited by examiner

*Primary Examiner*—Milton I. Cano
*Assistant Examiner*—H. Mai
(74) *Attorney, Agent, or Firm*—Eugene C. Rzucidlo; Greenberg Traurig LLP

(57) ABSTRACT

This invention relates to a cycloalliin-enriched onion extract produced by heating onions in the first place, crushing and squeezing them and subjecting the resulting onion juice to reheating or alkali treatment.

4 Claims, No Drawings

ONION EXTRACT RICH IN SULFURIZED CYCLIC AMINO ACID AND PROCESS FOR PRODUCING THE SAME

This application is 371 of PCT/JP98/03569 filed on Aug. 10, 1998.

TECHNICAL FIELD

This invention relates to a cycloalliin-enriched onion extract and a process for producing the same.

BACKGROUND ART

It is known that cycloalliin is a cyclic sulfur-containing amino acid having bioactivity such as fibrinolytic, hypoglycemic and hypolipidemic actions [Atherosclerosis, 21, 409–416 (1975), Japanese Laid-open H5-194237]. The onion intracellularly and abundantly contains the cycloalliin precursors S-(1-propenyl)-L-cysteine sulfoxide (hereinafter referred to as "precursor A") and γ-glutamyl-S-(1-propenyl)-L-cysteine sulfoxide (hereinafter referred to "peptide precursor"). It is known that said peptide precursor is transformed to said precursor A by the enzyme γ-glutamyl peptidase, γ-glutamyl transpeptidase or the like (Advances in Food Research, 22, 73–133 (1976)) and that precursor A is converted to cycloalliin on heating or alkali treatment (Bioscience, Biotechnology and Biochemistry, 58, 108–110 (1994)).

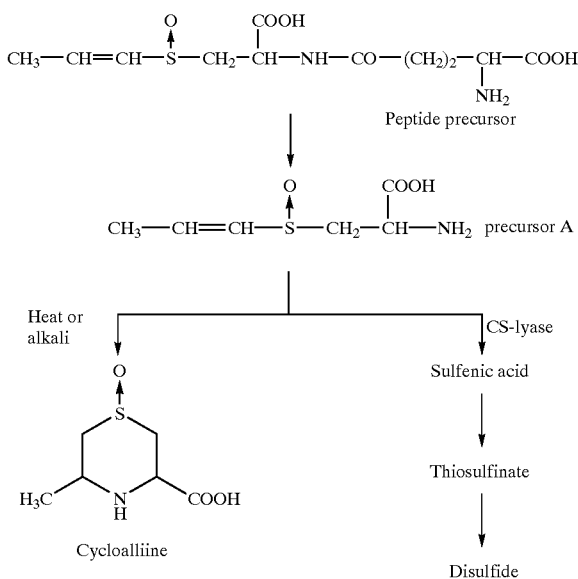

The onion extract heretofore available is intended for use as a condiment; because of a unique flavor originating from its volatile sulfur-containing fraction (disulfide, etc.), the onion extract has been used as a very important food component for seasoning. Production of such an onion extract for use as a condiment involves a sequence of peeling and washing onions, crushing and squeezing them, concentrating the resulting juice under reduced pressure, and pasteurizing the product. The onion flavor is expressed as said precursor A is converted to sulfenic acid by the CS-lyase endogenously present in onions in the crush-squeezing stage and the sulfenic acid so produced is then transformed through the thiosulfinate to the disulfide which is a flavor source.

Thus, in the process for producing an onion extract for use as a condiment, said precursor A is converted to the disulfide so that the conventional onion extract is lean in cycloalliin.

DISCLOSURE OF INVENTION

It is an object of this invention to provide an onion extract having an increased cycloalliin content (containing not less than 0.1%, preferably not less than 0.3% of cycloalliin as Brix 70 equivalent) which is of value as a health food or a starting material for the production of health foods and the other object is to provide an efficient process for producing a cycloalliin-containing onion extract which is easy to handle.

To accomplish the above objects, the inventors of this invention did many investigations. As a result, they discovered that when the CS-lyase is inactivated by heating onions prior to the crush-squeezing step, the loss of said precursor A is reduced and that when the onion juice available on crushing and squeezing of heated onions is further heated or subjected to alkali treatment, the precursor A is successfully converted to cycloalliin. This invention has been accordingly completed.

This invention, in one aspect, is directed to an onion extract rich in cycloalliin. In another aspect, this invention is concerned with a process for producing a cycloalliin-containing onion extract characterized by its comprising heating onions in the first place, crushing and squeezing them, and subjecting the resulting onion juice to reheating or alkali treatment.

The variety, growing district and harvest season of the onions to be used in this invention are not particularly restricted. The method of storage of the onions is not particularly restricted, either.

The onion juice in the context of this invention means a juice obtainable by the process which comprises crush-compressing onions by a suitable method and subsequently centrifuging them or extracting the same with, for example, water or warm water. The onion extract means a preparation obtainable by reducing the water content of the onion juice by a suitable method to thereby increase the percentage of solid matter.

The onion extract enriched in cycloalliin according to this invention can be produced by carrying out the following sequence of steps.

(1) Pretreating step (washing, peeling, sterilization, etc.)
(2) First heating step
(3) Crush-squeezing step
(4) Second heating or alkali treatment step
(5) Concentration step
(6) Pasteurization step The cycloalliin content of the extract can be further increased by interposing a step of treating the onion juice with an enzyme having peptide precursor (γ-glutamyl peptide)-cleaving activity [γ-glutamylpeptide cleavage step] prior to said (4) second heating or alkali treatment step.

This invention is now described in detail.

(1) Pretreating Step (Washing, Peeling, Sterilization, etc.)

Onions are washed with water using a water washing machine or the like, followed, if necessary, by peeling, sterilization, etc. The machinery or equipment for water washing is not particularly restricted.

(2) First Heating Step

The onions are then heated to inactivate the CS-lyase (first heating step). The heating temperature is 60–120° C., preferably 70–100° C., and the heating time is one minute to one hour, preferably 5–30 minutes.

(3) Crush-squeezing Step

The onions are then crushed to suitable size. The machinery or equipment for crushing is not particularly restricted.

For example, a pulverizing machine such as a feather mill, a homogenizer such as Mascolloider (Masuko Sangyo), a dicer, a chopper, or a home food cutter, for instance, can be mentioned. With an instant heater-disintegrator or the like machine which achieves both steam inactivation of the enzyme and crushing, the first heating and crushing operations can be more efficiently carried through.

To prepare an onion juice, the crushed onions are squeezed with a suitable press machine or centrifuged with a centrifugal machine. As an alternative, the crushed onions are extracted with hot water. For improved squeezing efficiency in such a hot-water extraction process, an enzyme treatment with cellulase, pectinase or protease etc. can be performed. The enzyme to be used is not particularly restricted insofar as it contributes to an improved squeezing efficiency. Usually, such an enzyme is added to water in a proportion of 0.005–0.1 weight % relative to the onions and the onions are treated under warming at pH 2–9 and 40–70° C. for 30 minutes to 40 hours.

(4) Second Heating or Alkali Treatment Step

Then, for the purpose of converting precursor A to cycloalliin, the onion juice is reheated or treated with an alkali. The temperature for reheating is 90–120° C., preferably 90–100° C., and the heating time is 10 minutes to 4 hours, preferably 30 minutes to 2 hours. The alkali treatment is carried out at pH 7–12, preferably pH 9–10, and the treating time is 5 minutes to 2 hours, preferably 10 minutes to 1 hour. The alkali for use is not particularly restricted but includes sodium hydroxide, potassium hydroxide, sodium carbonate, potassium carbonate, sodium hydrogencarbonate and potassium hydrogencarbonate, among others. When the product after the alkali treatment is alkaline, it is neutralized with an acid such as hydrochloric acid. The alkali treatment and heat treatment can be carried out in combination.

The heating operation for inactivating said CS-lyase (first heating step) and the heating operation for converting precursor A to cycloalliin (second heating step) may be performed in a single heating cycle. In this case, however, the onions will be softened too much to retain their shape so that considerable difficulties will be encountered in their transportation to the crush-squeezing equipment and the crushing and squeezing operation there. The result is that an onion extract can hardly be produced on a mass scale with good efficiency. The above difficulties can be obviated by carrying out heating in two steps in accordance with this invention.

γ-Glutamyl Peptide-cleaving Step

Prior to said (4) second heating or alkali treatment step for converting precursor A to cycloalliin, the onion juice is treated with an enzyme having γ-glutamyl peptide-cleaving activity, whereby peptide precursor can be converted to precursor A. As a result, the cycloalliin content of the onion extract can be further increased.

Thus, to the juice obtained by said first heating and crush-squeezing operations, an enzyme having γ-glutamyl peptide-cleaving activity is added and the juice is treated around the optimal pH of the enzyme used, for example pH 2–9, at a temperature of 40–50° C. for 2–4 hours. The level of use of the enzyme is 0.001–1.0 weight % relative to the onion juice. After this treatment, the enzyme is inactivated by heating at its inactivation temperature, for example heating up to 80–90° C.

The enzyme for use is not particularly restricted insofar as it has γ-glutamyl peptide-cleaving activity, thus including γ-glutamyl peptidase, γ-glutamyl transpeptitase and glutaminase, among others. As the enzyme, the fermentation product obtained or derived by growing a producer strain of microorganism in the routine manner or the enzyme which can be derived from an animal tissue (kidney, small intestinal mucosa, etc.) or isolated from the vegetable kingdom (e.g. mushrooms such as *Cortinellus shiitake*, meadow mushroom, etc., asparagus, kidney bean, etc.). As an alternative, a commercial enzyme or an enzyme purified from a commercial enzyme or enzyme preparation can also. be utilized.

Furthermore, at the stage of converting peptide precursor to precursor A using said enzyme having γ-glutamyl peptide-cleaving activity, the onion juice may be optionally treated with such an enzyme as pectinase, cellulase or the like for the purpose of reducing the viscosity of the onion extract in the subsequent concentration step. The enzyme which can be used for this purpose is not particularly restricted insofar as it is capable of reducing the extract viscosity. The level of addition of this enzyme is generally 0.005–0.1 weight % relative to the onion juice. The conditions of this enzymatic treatment vary with different kinds of enzymes but may for example be 40–50° C., pH 2–9, and reaction time 2–4 hours. After this enzyme treatment, the enzyme is generally inactivated by heating at the inactivation temperature of the enzyme used, for example heating up to 80–90° C.

(5) Concentration Step

The onion juice is concentrated to provide an onion extract. The method for concentration includes the vacuum concentration method using an evaporator, the method using a concentration kettle, the method using a reverse osmosis membrane, the freeze-concentration method and any other method. The concentration equipment suited to each method can be employed. Thus, provided that the water content can be reduced, any equipment can be utilized. The degree of concentration is not particularly restricted but is preferably within the range of 30–75 weight % in terms of the concentration of water-soluble solids in the concentrate.

(6) Pasteurization Step

The onion extract thus obtained is usually heated for sterilization. The pasteurizing conditions are preferably as mild as possible in order to prevent deterioration in color and flavor. Specifically, the conditions of 90–95° C. for 5–60 minutes or 100–130° C. for 3–50 seconds may be mentioned. The onion extract thus obtained contains cycloalliin in a proportion of not less than 0.1% in terms of Brix 70 equivalent (Brix is a unit representing the concentration of water-soluble solids and Brix 70, for instance, means that the concentration of soluble solids is 70%; the same applies hereinafter).

The cycloalliin-rich onion extract of this invention is of value as a health food or a raw material for health foods and can be put to use either as it is as a food or by adding it to other foodstuffs.

BEST MODE FOR CARRYING OUT THE INVENTION

The following experimental, working and reference examples are further illustrative of this invention and should by no means be limited the scope of the invention.

EXPERIMENTAL EXAMPLE 1

Change in Cycloalliin Content Due to Two-stage Heating

Using 250 g of onions produced in Osaka (Large size), the variation in the cycloalliin content of the onion juice was investigated by performing 3-hour heating at 60° C., 1-hour heating at 100° C. and crushing operation in various combination, and crushing raw onions simply. The cycloalliin content was measured by HPLC using an NH column (Bioscience, Biotechnology and Biochemistry, 58, 108–110 (1994)). The results are shown in Table 1.

TABLE 1

| Treating conditions | Cycloalliin content (%) |
|---|---|
| Raw → crushing | 0.062 |
| 3-hr heating at 60° C. → crushing | 0.056 |
| 3-hr heating at 60° C. → crushing → 1-hr heating at 100° C. | 0.103 |
| 3-hr heating at 60° C. → 1-hr heating at 100° C. → crushing | 0.109 |

(The arrowmark (→) indicates that the operation before the mark precedes the operation after the mark; the same applies hereinafter).

When the uncrushed onions were simply heated at 60° C. for 3 hours and then crushed, there was no gain in cycloalliin content as compared with the case in which the raw onions were simply crushed. However, when the onions were heated at 60° C. for 3 hours and reheated at 100° C. for 1 hour (two-stage heating), there was realized an increase in cycloalliin content. When the onions were heated at 60° C. for 3 hours, further heated at 100° C. for 1 hour (two-stage heating) and finally crushed, too, the cycloalliin content was increased as compared with the case in which raw onions were simply crushed and the case in which the onions were heated at 60° C. for 3 hours (one-stage heating).

It is, thus, evident that in order to produce an onion extract with an increased cycloalliin content, it is necessary to heat onions before crushing so as to inactivate the CS-lyase and that, after this inactivation of the CS-lyase, it is necessary to provide a step of heating at a higher temperature, either before or after crushing, for converting precursor A to cycloalliin.

EXPERIMENTAL EXAMPLE 2

Study of the Conditions of First Heating in the Two-stage Heating Protocol

Onions produced in Shinoro, Hokkaido (Medium size), 250 g, were longitudinally cut in four and heat-treated at 60–80° C. for 1–30 minutes or at 100° C. for 1 minute. The heated onion cuttings were crushed and squeezed and the resulting juice was heated in boiling water for 1 hour and analyzed for the change in cycloalliin content. The results are shown in Table 2.

TABLE 2

| Heating temperature | Cycloalliin content (%) Heating time (min.) | | | |
|---|---|---|---|---|
| | 1 | 5 | 10 | 30 |
| 60° C. | 0.035 | 0.035 | 0.032 | 0.113 |
| 70° C. | 0.040 | 0.155 | 0.131 | 0.111 |
| 80° C. | 0.141 | 0.157 | 0.133 | 0.100 |
| 100° C. | 0.173 | — | — | — |

It is clear that at 70° C., the endogenous CS-lyase could be inactivated by heating in a short time of about 5–10 minutes and that at 80° C. or 100° C., the CS-lyase could be inactivated by heating in a still shorter period of 1 minute.

EXPERIMENTAL EXAMPLE 3

Change in Cycloalliin Content Due to Glutaminase Treatment and Second Heating

Onions produced in Awaji, 250 g, were cut in four, crushed with a homogenizer, and centrifuged to prepare an onion juice (hereinafter referred to as "onion juice without experiencing the first heating step").

Separately, onions produced in Awaji were cut in four, soaked in hot water at 80° C. for 30 minutes, crushed with a homogenizer and centrifuged to give an onion juice (hereinafter referred to as "onion juice which had experienced the first heating step").

The onion juice without experiencing the first heating step and the onion juice which had experienced the first heating step were respectively subjected to glutaminase treatment (Glutaminase Daiwa, Daiwa Kasei Co., 40° C., 30 or 60 minutes) and second heating (90° C., 60 minutes) in various combinations to investigate the variation in the cycloalliin content of the onion juice.

The results are shown in Table 3.

TABLE 3

| Treating conditions | Cycloalliin content (%) |
|---|---|
| *The juice without experiencing the first heating step* | |
| The juice as such | 0.012 |
| Heating at 90° C. for 60 min. | 0.011 |
| Glutaminase treatment for 30 min. | 0.017 |
| Glutaminase treatment for 30 min. → heating at 90° C. for 60 min. | 0.055 |
| Glutaminase treatment for 60 min. | 0.022 |
| Glutaminase treatment for 60 min. → heating at 90° C. for 60 min. | 0.074 |
| *The juice which had experienced the first heating step* | |
| The juice as such | 0.020 |
| Heating at 90° C. for 60 min. | 0.049 |
| Glutaminase treatment for 30 min. | 0.023 |
| Glutaminase treatment for 30 min. → heating at 90° C. for 60 min. | 0.090 |
| Glutaminase treatment for 60 min. | 0.027 |
| Glutaminase treatment for 60 min. → heating at 90° C. for 60 min. | 0.101 |

In the juice experiencing the first heating step, the peptide precursor remaining intact from the action of CS-lyase was converted to precursor A by the action of glutaminase so that the cycloalliin content was increased in the subsequent second heating step.

In the juice which had experienced the first heating step, the precursor A formed from peptide precursor by the action of glutaminase was superposed on the precursor A that had remained intact from the action of CS-lyase, with the result that the cycloalliin content after the subsequent second heating step was increased as compared with the case in which said juice without experiencing the first heating step was subjected to said glutaminase treatment and second heating step.

It is clear from the above results that an enzymatic treatment with glutaminase or the like enzyme having γ-glutamyl peptide-cleaving activity prior to the second heating step for converting precursor A to cycloalliin results in a further increase in the cycloalliin content.

REFERENCE EXAMPLE 1

Production of an Onion Extract (1)

For comparison with the extract of this invention, an onion extract experiencing neither the first heating step nor the second heating step was provided.

(1) Pretreating Step

Onions produced in Hokkaido, 190 kg, were washed twice with a water washing machine.

(2) Crush-squeezing Step

The onions washed in the preceding step were crushed using a feather mill and the crushings were squeezed with a press to provide 100.3 kg of a juice (Brix 7.6).

(3) Concentration Step

The supernatant, 75.9 kg (Brix 7.6), of the juice obtained in the preceding step was concentrated under reduced pressure (heating temperature 92° C., evaporation temperature 42° C.) using a centrifugal thin-film vacuum concentration machine to provide 6.4 kg of an onion extract (Brix 72.5). The cycloalliin content was 0.026%.

EXAMPLE 1

Production of an Onion Extract (2)

(1) Pretreating Step

Onions produced in Hokkaido, 190 kg, were washed once with a water washing machine.

(2) First Heating Step

The onions washed with water in the preceding step were placed in a spoon net and immersed in 1330 L of hot water at 80° C. for 30 minutes.

(3) Crush-squeezing Step

The onions were then crushed in a feather mill and the crushings were squeezed with a screw press to provide 97.6 kg of a juice (Brix 7.6).

(4) Second Heating Step

The supernatant (Brix 7.6), 81.8 kg, of the juice obtained in the preceding step was heated at 90° C. for 60 minutes.

(5) Concentration Step

The juice heated in the above step was concentrated under reduced pressure using a centrifugal thin-film vacuum concentration machine to provide 6.5 kg of a light-yellow, translucent onion extract (Brix 70.2). The cycloalliin content was 0.692%.

Compared with the onion extract obtained in Reference Example 1, the onion extract obtained in Example 1 was by far higher in cycloalliin content. It is, therefore, clear that the first and second heating steps are of great importance in increasing the cycloalliin content.

EXAMPLE 2

Production of an Onion Extract (3)

(1) Pretreating Step

Onions produced in Hokkaido, 300 kg, were washed once with a water washing machine.

(2) First Heating Step

The onions washed with water in the preceding step were placed in a spoon net and immersed in 1000 L of hot water at 80° C. for 30 minutes.

(3) Crush-squeezing Step

The onions heated in the preceding step were crushed using a feather mill and the crushings were squeezed with a press to provide 183 kg of a juice supernatant (Brix 9.8).

(4) γ-glutamyl Peptide-cleaving Step

The supernatant obtained in the preceding step was put in a 200-L can. To 3 L of water were added 90 g of glutaminase (Glutaminase Daiwa, Daiwa Kasei Co.) and 15 g of cellulase, and the mixture was stirred gently for 30 minutes and, then, fed into the above 200-L can. The reaction was carried out at 40° C. for 1 hour to convert peptide precursor to precursor A.

(5) Second Heating Step

The above juice was heated at 90° C. for 60 minutes, at the end of which time it was cooled and allowed to stand overnight.

(6) Concentration Step

The juice heated in the preceding step was concentrated under reduced pressure (heating temperature 95° C., evaporation temperature 35° C.) using a centrifugal thin-film vacuum concentration machine to provide an onion extract.

(7) Pasteurization Step

The onion extract thus obtained was pasteurized and packaged to provide 23 kg of an onion extract (Brix 72.7). The cycloalliin content was 0.751%.

INDUSTRIAL APPLICABILITY

In accordance with this invention, cycloalliin-enriched onion extract could be provided as described above. Furthermore, such an onion extract could be produced with high efficiency. The onion extract according to this invention is rich in cycloalliin and can be used as it is as a health food. Moreover, the onion extract of this invention may also be utilized as a raw material for health foods.

What is claimed is:

1. A process for producing an onion extract that contains at least 0.3% of cycloalliin in terms of Brix 70 equivalent comprising the steps of heating onions, then crushing and squeezing said onions, and subjecting the resulting onion juice to reheating or alkali treatment.

2. The process for producing an onion extract as claimed in claim 1 further characterized by its comprising heating onions at 60–120° C., crushing and squeezing them, and reheating the resulting onion juice at 90–120° C. or treating it with an alkali at pH 7–12.

3. The process for producing an onion extract as claimed in claim 1 further characterized in that, prior to the reheating or alkali treatment of the onion juice, the juice is treated with an enzyme having γ-glutamyl peptide-cleaving activity.

4. The process for producing an onion extract as claimed in claim 3 further characterized by its comprising adding pectinase or cellulase at the time of treating the onion juice with the enzyme having γ-glutamyl peptide-cleaving activity.

* * * * *